L. W. BOGART.
DRIVING MECHANISM FOR AUTOMOBILES.
APPLICATION FILED DEC. 29, 1909.
1,059,109.
Patented Apr. 15, 1913.
2 SHEETS—SHEET 1.
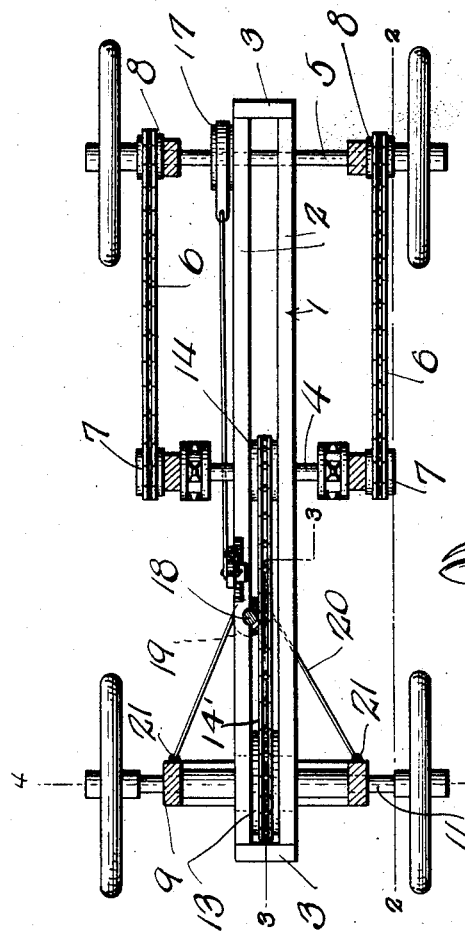
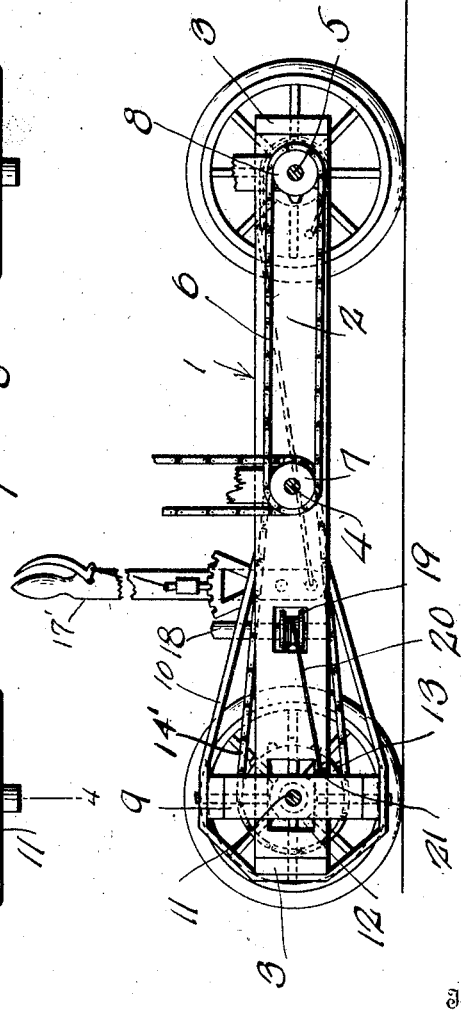
Inventor
Levi W. Bogart,
By Victor J. Evans
Attorney
Witnesses
G. C. Kane
Chas. C. Richardson L. W. BOGART.
DRIVING MECHANISM FOR AUTOMOBILES.
APPLICATION FILED DEC. 29, 1909.
1,059,109.
Patented Apr. 15, 1913.
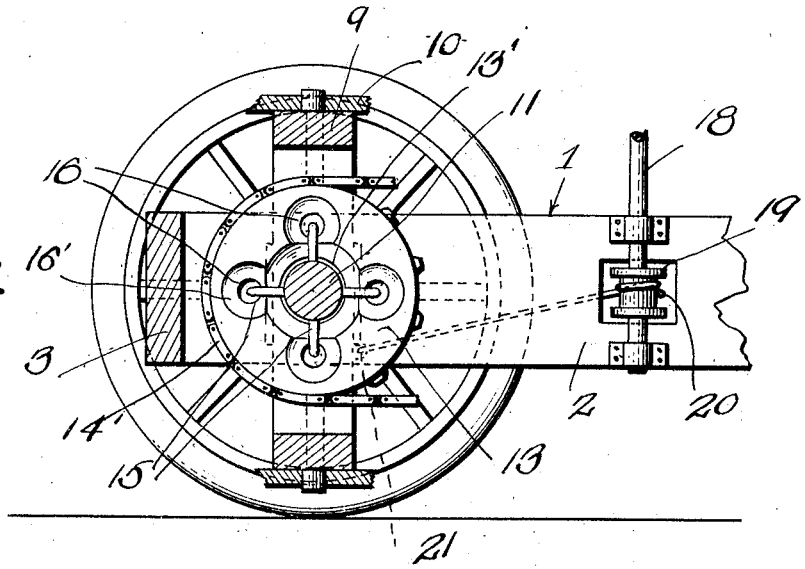
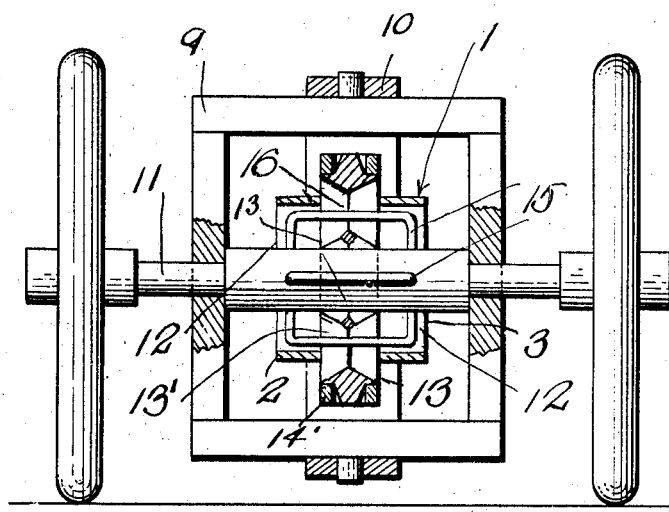

UNITED STATES PATENT OFFICE.

LEVI W. BOGART, OF TRAIL, OKLAHOMA.

DRIVING MECHANISM FOR AUTOMOBILES.

1,059,109.  Specification of Letters Patent.  Patented Apr. 15, 1913.

Application filed December 29, 1909. Serial No. 535,393.

*To all whom it may concern:*

Be it known that I, LEVI W. BOGART, a citizen of the United States, residing at Trail, in the county of Dewey and State of Oklahoma, have invented new and useful Improvements in Driving Mechanism for Automobiles, of which the following is a specification.

This invention relates to certain novel and useful improvements in driving mechanism for automobiles.

In carrying out my invention, it is my purpose to provide an improved driving mechanism for automobiles whereby power may be transmitted to both the front and rear axles without interfering with the swinging motion of the front axle such as is necessary for the successful operation of the steering mechanism.

A further object of my invention is to provide a mechanism which will enable the machine to readily ascend hills or grades, and which will distribute the strain of the machine equally over the latter.

With the above-recited objects and others of a similar nature in view, the invention consists in the construction, combination and arrangement of parts, set forth in and falling within the scope of the appended claim.

In the drawing:—Figure 1 is a view, partly in plan and partly in section of a machine embodying my invention. Fig. 2 is a vertical sectional view taken on the line 2—2 of Fig. 1. Fig. 3 is a sectional view taken on the line 3—3 of Fig. 1. Fig. 4 is a cross sectional view taken through the front of the running gear on the line 4—4 of Fig. 1.

Referring now to the accompanying drawings in detail, the numeral 1 indicates a rectangular frame which is located beneath the body of the machine, said frame comprising a pair of longitudinal side bars 2—2 connected at their ends by the transverse bars 3. Extending transversely of the frame is the transmission shaft 4, receiving power from any suitable engine, while 5 indicates the rear axle journaled in the side bars 2 of the frame, the axle being in driving engagement with the transmission shaft 4 through the medium of the endless chains 6 which are driven by sprockets 7 on the shaft 4 and run over sprockets 8 on the rear axle.

The front truck frame is indicated at 9 and is pivotally mounted so as to have a swinging movement in the bracket 10 carried at the adjacent end of the frame 2.

The numeral 11 indicates the front axle, which is journaled in the truck frame 9 and passes through elongated apertures 12 located in the forward ends of the side bars 2. To the forward axle 11, between the side members 2 of the frame is keyed a sprocket wheel 13 which is connected in driving engagement with the sprocket wheel 14 on the transverse shaft 4 by means of an endless chain 14', as clearly shown in Fig. 1.

The front axle is provided with a centrally enlarged portion from which projects a series of elongated radially extending approximately U-shaped keys 15 adapted to lie within the radial grooves 16 formed in the sprocket wheel 13. In order to permit these keys 15 to move out of a position perpendicular to the plane of the sprocket 13, when the axle is swinging, the grooves 16 are provided with lateral offsets 16', as shown in Fig. 3. The inner portion of the hub of the sprocket wheel 13 is beveled as at 13' in such a manner as to permit the front axle to swing either to the right or left while the sprocket 13 is prevented from turning by the side bars 2.

A brake 17 is connected to the rear axle 5 and is adapted to be operated by a lever 17' on one of the side bars 2 while any suitable steering means may be employed for the machine. In the present instance I employ a steering mechanism comprising a vertical shaft 18 journaled in the frame 1 and carrying at its lower end a drum 19 over which passes a cable 20, the opposite ends of the latter being connected as at 21 to the sides of the truck frame 9.

I claim:—

The combination with a steering axle, of a sprocket wheel formed with a central aperture through which said axle is passed and provided with grooves disposed about said aperture, the faces of the wheel being laterally offset contiguous the grooves therein, a series of radially extending U-shaped keys carried by the axle and designed to lie in the grooves formed in the sprocket wheel whereby the front axle may swing relatively to the sprocket wheel within a predetermined limit, and means for driving said sprocket wheel.

In testimony whereof I affix my signature in presence of two witnesses.

LEVI W. BOGART.

Witnesses:
  J. R. JAMES,
  H. JAMES.